United States Patent
Ginatulin et al.

(10) Patent No.: US 9,355,786 B2
(45) Date of Patent: May 31, 2016

(54) MULTI-ELEMENT ELECTROCHEMICAL CAPACITOR AND A METHOD FOR MANUFACTURING THE SAME

(75) Inventors: Yuriy Midhatovich Ginatulin, Almaty (KZ); Andrey Viktorovich Desyatov, Moscow (RU); Anton Vladimirovich Asseyev, Almaty (KZ); Aleksandr Petruvich Kubyshkin, Moskovskaya obl. (RU); Sergey Ivanovich Sirotin, Moscow (RU); Lyubov Vladimirovna Bulibekova, Almaty (KZ); Lyubov Densunovna Li, Almaty (KZ)

(73) Assignee: UG INVESTMENTS LTD., Tortola (VG)

( * ) Notice: Subject to any disclaimer, the term of this patent is extended or adjusted under 35 U.S.C. 154(b) by 763 days.

(21) Appl. No.: 13/642,204

(22) PCT Filed: Apr. 19, 2011

(86) PCT No.: PCT/RU2011/000251
§ 371 (c)(1),
(2), (4) Date: Jan. 21, 2013

(87) PCT Pub. No.: WO2011/133069
PCT Pub. Date: Oct. 27, 2011

(65) Prior Publication Data
US 2013/0335885 A1    Dec. 19, 2013

(30) Foreign Application Priority Data

Apr. 23, 2010 (RU) ................................ 2010116079

(51) Int. Cl.
*H01G 9/048* (2006.01)
*H01G 11/36* (2013.01)
(Continued)

(52) U.S. Cl.
CPC ............. *H01G 9/048* (2013.01); *H01G 9/0029* (2013.01); *H01G 11/36* (2013.01); *H01G 11/42* (2013.01);
(Continued)

(58) Field of Classification Search
CPC ..... H01G 9/048; H01G 9/0029; H01G 11/48; H01G 11/36; H01G 11/42
See application file for complete search history.

(56) References Cited

U.S. PATENT DOCUMENTS 6,205,016 B1 *  3/2001  Niu ............................... 361/503
6,664,006 B1 * 12/2003  Munshi ......................... 429/305
(Continued)

FOREIGN PATENT DOCUMENTS

RU      2329257       7/2008
WO    2009103661      8/2009

*Primary Examiner* — David M Sinclair
(74) *Attorney, Agent, or Firm* — Preston Smirman; Smirman IP Law, PLLC (57) ABSTRACT

The invention relates to electrical engineering. The multi-element electrochemical capacitor of this invention comprises at least one layer of electrical insulation film with alternating opposite-polarity electrode films placed thereon in succession and interspaced by a porous ion-permeable separator, coiled into a roll. Each electrode sheet is a substrate of nonwoven polymer material at a high pore ratio, with at least one electrode in the form of an electrochemically active layer attached to one side or both sides thereof, or embedded within the same. The capacitor also comprises contact electrodes. The method for manufacturing a multi-element electrochemical capacitor comprises preparing electrode mixtures; making opposite-polarity electrode sheets by applying an electrode mixture thereto; placing the opposite-polarity electrode sheets successively on the electrical insulation film layer; coiling the electrode sheets and film layer into a roll around a central electrode; connecting the outer surface of the roll to a peripheral electrode; and impregnating the roll with electrolyte. The technical effect consists in improved specific characteristics of the electrochemical electric energy storage, stability of the specific characteristics, and a longer service life of the capacitor.

27 Claims, 4 Drawing Sheets

(51) Int. Cl.
*H01G 11/42* (2013.01)
*H01G 11/48* (2013.01)
*H01G 9/00* (2006.01)
*B82Y 99/00* (2011.01)

(52) U.S. Cl.
CPC ............... *H01G 11/48* (2013.01); *B82Y 99/00* (2013.01); *Y02E 60/13* (2013.01); *Y10S 977/948* (2013.01); *Y10T 29/417* (2015.01)

(56) References Cited

U.S. PATENT DOCUMENTS

| | | | |
|---|---|---|---|
| 7,623,340 B1 | 11/2009 | Song et al. | |
| 2006/0035140 A1* | 2/2006 | Matsumoto | 429/160 |
| 2006/0221551 A1 | 10/2006 | Kim et al. | |
| 2010/0321864 A1* | 12/2010 | Azais et al. | 361/502 |

* cited by examiner

MULTI-ELEMENT ELECTROCHEMICAL CAPACITOR AND A METHOD FOR MANUFACTURING THE SAME

CROSS-REFERENCE TO RELATED APPLICATION

The instant application is a national phase of, and claims priority to, PCT International Application No. PCT/RU2011/000251, filed on Apr. 19, 2011, pending, and Russian Patent Application Serial No. 2010116079, filed Apr. 23, 2010, pending, the entire specifications of both of which are expressly incorporated herein by reference.

FIELD OF THE INVENTION

The invention relates to electrical engineering, in particular, to the manufacture of electrochemical capacitors having a combined charge storage mechanism and other similar rechargeable electric energy storages.

BACKGROUND OF THE INVENTION

A prior art multi-element capacitor (see: Application PCT WO 2009103661, cl. H01G 9/155, published on Aug. 27, 2009, 34 pages) comprises at least two adjacent composite electrodes separated by a spacing d and at least one composite electrode common for the aforesaid electrodes and held apart therefrom by a separator, the composite electrodes being coiled together into a roll.

This design gives rise to unavoidable problems in providing reliable low-resistance contact between the electrode and the commutator. Furthermore, discontinuity of the electrode material may cause undesirable reaction between the electrolyte and the commutator material that may, in turn, reduce the operating voltage of the capacitor by the electrochemical decomposition potential of the commutator. Absence of insulation between the adjacent capacitor electrodes is another major deficiency of the design reducing voltage and, therefore, specific energy of the capacitor. As a result, when capacitor sections are connected in series the potential differentials of the electrodes may be double the operating voltage of the capacitor elements. This is likely to initiate electrochemical electrode reactions limiting the lifetime of the capacitor.

A prior art method for manufacturing a multi-element capacitor is described in Application PCT WO 2009103661, cl. H01G 9/155, published on Aug. 27, 2009, 34 pages. According to the prior art method, an electrode is placed between two separators that are actually separating bands, with two composite electrodes placed at a distance d between them on the top band. The bands and the electrodes are then coiled into rolls.

The prior art invention is disadvantageous because the multi-element capacitor comprises individual components in the form of spaced electrodes that are difficult to be combined into a multi-element assembly, particularly in a continuous roll-making process. The use of a multilayered composite structure comprising an electrode applied to the metal commutator surface is another disadvantage of the prior art invention.

SUMMARY OF THE INVENTION

It is an object of the claimed invention to improve the structural elements of a device and develop a sectional rolled multi-element electrochemical capacitor free of the deficiencies of the closest prior art invention and capable of attaining specific characteristics making it a practicable technological and economic option to use.

Improving the specific characteristics of the electrochemical electric energy storage, maintaining stability of the specific characteristics, and extending the service life are the common technical effect of both the method and the device.

The technical result of this invention is achieved in a multi-element electrochemical capacitor that comprises at least one layer of electrical insulation film having alternating electrode sheets of opposite polarities spaced apart by a porous ion-permeable separator that are placed on the electrical insulation film, the film and the alternating sheets being coiled into a roll and impregnated with electrolyte. Moreover, each electrode sheet is a substrate made of nonwoven polymer material of a high pore ratio and provided with at least one electrode attached to one side or both sides thereof, or therein, said electrode being an electrochemically active layer containing nano-sized particles of metals or compounds thereof, or redox polymers. Furthermore, the electrodes of the opposite polarity electrode sheets are made of nano-structured carbon materials of different types. One of the nano-structured carbon materials has a maximum possible specific surface area and a relatively low conductance, while the other material has a relatively large specific surface area and a relatively high conductance. The capacitor further comprises contact electrodes connectable to the central and peripheral electrodes.

The substrate may be made of an electron-impermeable, ion-impermeable material that is chemically and electrochemically inactive in the material electrolyte.

Carbon nano-tubes of only a few layers may serve as one of the nano-structured electrodes, and activated carbon, activated carbon black, carbon impregnated with metals, and nano-porous carbon material based on carbides of metals such as Ti, B, and Si may be used as the other nano-structured carbon material.

The material of the positive electrode of the electrode sheet may contain nano-sized particles of metals such as manganese, mercury, silver, and nickel, and metal compounds such as manganese oxide, manganese hydroxide, mercury oxide, silver oxide, lead oxide, lead sulfate, nickel hydroxide, and lithium-cobalt oxide. The material of the negative electrode may contain nano-sized particles of metals such as zinc, lead, cadmium, iron, and lithium, and metal compounds such as zinc hydroxide, zinc chloride, lead sulfate, cadmium hydroxide, and iron hydroxide.

The electrode sheet in contact with the electrical insulation film is placed with its electrochemically active layer up with respect to the electrical insulation film, and the next electrode sheet is placed thereon with a shift equal to half the width of the electrochemically active layer thereof such that the electrochemically active layers of the electrode sheets are facing each other and are interspaced by a porous ion-permeable separator.

The electrodes of the electrode sheet may be attached to the substrate in succession.

The outer surface of the roll may be connected to a peripheral electrode by a contact electrode such that the roll is placed in the peripheral electrode that is a length of a metal rube. The end faces of the peripheral electrode may be provided with covers.

The above technical effect is also achieved in a method for manufacturing a multi-element electrochemical capacitor that comprises preparing electrode mixtures containing nano-structured carbon materials of various types. One of the nano-structured carbon materials has the largest possible specific surface area and a relatively low conductance, while the other material has a relatively large specific surface area and a relatively high conductance. The method also comprises manufacturing opposite-polarity electrode sheets by applying an electrode mixture to one side or both sides of, and placing it within, the substrate made of a nonwoven polymer material of a high pore ratio, covering the substrate with an electrochemically active layer containing nano-sized particles of metals or compounds thereof, or redox polymers. Opposite-polarity electrode sheets interspaced by a porous ion-permeable separator are placed successively on at least one layer of electrical insulation film, coiled into a roll around a central electrode, the outer surface of the roll is connected to a peripheral electrode, and the roll is impregnated with electrolyte.

According to the method, the electrical insulation film layers and alternating opposite-polarity electrodes sheets interspaced by an ion-permeable separator placed on the film are spread in parallel planes.

The outer surface of the roll may be connected to a peripheral electrode by a contact electrode that serves as the outer surface of the roll, and the rolls is placed in the peripheral electrode. Furthermore, after the roll has been impregnated with electrolyte, the end faces of the peripheral electrode may be closed with covers made of an electrical insulation material. The central and peripheral tube electrodes may be made of aluminum or alloys thereof, and the covers are made of plastics.

Carbon nano-tubes of only a few layers are used in the claimed method as one of the nano-structured carbon materials, and activated carbon, activated carbon black, metal-impregnated carbon, and nano-porous carbon material on the basis of carbides, such as Ti, B, and Si carbides, can be used as the other nano-structured carbon material.

The method also provides for the use of carbon nano-tubes of a few layers obtained by pyrolysis of a mixture of a gaseous hydrocarbon and hydrogen and having a size of 5 to 50 nm, a specific surface area of 500 to 1,000 $m^2/g$, and specific conductance of 10-100 Sm/cm. Pyrolysis of the mixture of the gaseous hydrocarbon and hydrogen is carried out at a temperature maintained within the range of 650 to 900° C. and pressure within the range of 0.1 to 1.0 MPa, on a catalyst such as compounds based on cobalt and molybdenum or nano-structured magnesium oxide, and natural gas, or propane, or butane, or ethylene is used as the gaseous hydrocarbon.

The method may use carbon nano-tubes of a few layers obtained by pyrolysis of a mixture of an aromatic hydrocarbon and alcohol. Pyrolysis of a mixture of an aromatic hydrocarbon and alcohol is carried out at a temperature maintained within the range of 650 to 900° C. and pressure within the range of 0.1 to 1.0 MPa, on a catalyst such as compounds based on iron, nickel, and magnesium oxide, and benzene and toluene are used as an aromatic hydrocarbon, with ethanol used as alcohol.

Furthermore, carbon nano-tubes of a few layers are further treated, following manufacture, with oxidizing agents, ultrasound, or water in supercritical conditions.

The method may use activated carbons produced by forming a synthetic monomer in fluid followed by carbonization and high-temperature vapor-gas activation at a temperature of 600 to 1,100° C.

The method may use nano-porous carbon materials produced from boron, titanium, and silicon carbides. They are further subjected to high-temperature thermochemical treatment with chlorine at a temperature of 600 to 1,200° C.

To prepare an electrode mixture, carbon nano-tubes of a few layers and activated carbon are mixed at a ratio of 1:3 to 3:1 in ball mills until a grain size of 10 to 100 nm is achieved, sifted on typical 100 nm mesh sieves, and treated by ultrasound to give maximum uniformity to the electrode mixture.

The nano-tubes and carbon black are mixed by layer-by-layer centrifuging in a centrifuge.

The positive electrode of the electrode sheet is manufactured from nano-sized particles of metals such as manganese, mercury, silver, and nickel, and metal compounds such as manganese dioxide, manganese hydroxide, mercury oxide, silver oxide, lead oxide, lead sulfate, nickel hydroxide, and lithium-cobalt oxide. The negative electrode is manufactured from nano-sized particles of metals such as zinc, lead, cadmium, iron, and lithium, and metal compounds such as zinc hydroxide, zinc chloride, lead sulfate, cadmium hydroxide, and iron hydroxide.

An electrode sheet is obtained by covering a substrate with a suspension comprising an electrode mixture dispersed by ultrasound in an organic solvent, which is isopropanol or ethanol.

The electrode mixture may also be applied to a substrate in powder form under the effect of electrostatic forces.

Following the application of the electrode mixture, the resultant electrode sheet is placed on a contact electrode such as graphite foil, whereupon it is heated to a temperature of 120 to 150° C. and subjected to pressure ranging from 0.5 to 1.0 MPa. The contact electrodes are secured to peripheral electrode sheets.

A porous separator of one to four layers thick may be provided by a track membrane made of polymer film 3 to 5 μm thick, with a pore ratio of 20 to 40% and pore size of 0.05 to 0.1 μm, or a sheet of nonwoven material such as polypropylene 10 μm thick at a density of 15 to 40 $mg/cm^2$, or an ion-permeable polymer membrane made of polybenzimidazole 10 to 15 μm thick, impregnated with electrolyte and containing 3 to 10 mass parts of electrolyte.

Organic electrolyte comprising an organic salt solution containing ammonium or imidazole base cations and anions including tetrafluoroborate, hexafluorophosphate or triflatimide, or bistriflatimide, or tris(pentafluoroethyl)trifluorophosphate, in acetonitrile, or propylenecarbonate, or formamide, or a mixed electrolyte containing a solution of zinc chloride in acetonitrile, or inorganic electrolyte as an aqueous solution of a potassium alkali. The roll may be impregnated with electrolyte in a vacuum chamber under a residual pressure of 10 Pa.

The method may provide for coiling several parallel electrode sheets into a roll that is placed in a container of parallelepiped or cylindrical shape.

DESCRIPTION OF THE EMBODIMENTS OF THE INVENTION

Figure 1:
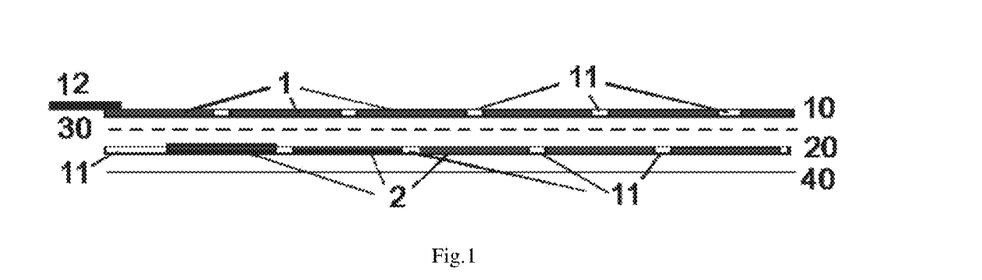
FIG. 1 is a diagrammatic view of a multi-element electrochemical capacitor.

The multi-element electrochemical capacitor (FIGS. 1 to 3) comprises a layer of electrical insulation film 40, an electrode sheet 10, an electrode sheet 20, and a porous separator 30 placed between electrode sheets 20 and 10. Electrode sheets 10 and 20 each consist of a substrate 11 and electrodes 1 and 2 attached thereto in succession. The thickness of substrate 11 in the specific embodiments of the claimed electrochemical capacitor may be selected within the range of 5 to 150 μm, preferably from 10 to 50 μm, and the thickness of the electrochemically active layers of electrodes 1 and 2 varies from 100 to 500 μm, preferably from 300 to 400 μm.

Figure 3:
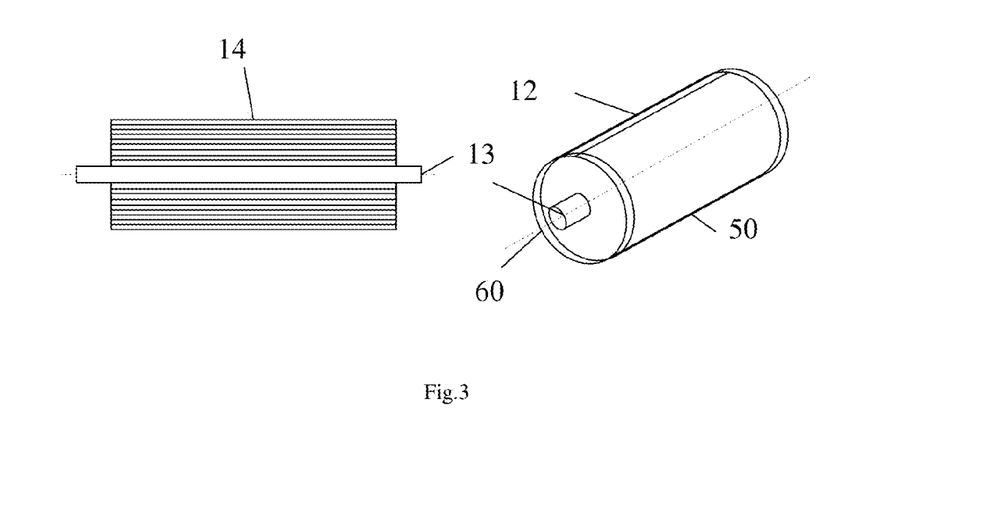
FIG. 3 is a diagrammatic view of the structure of a multi-element electrochemical capacitor, showing the location of electrodes of an electrode sheet coiled into a roll.
Figure 4:
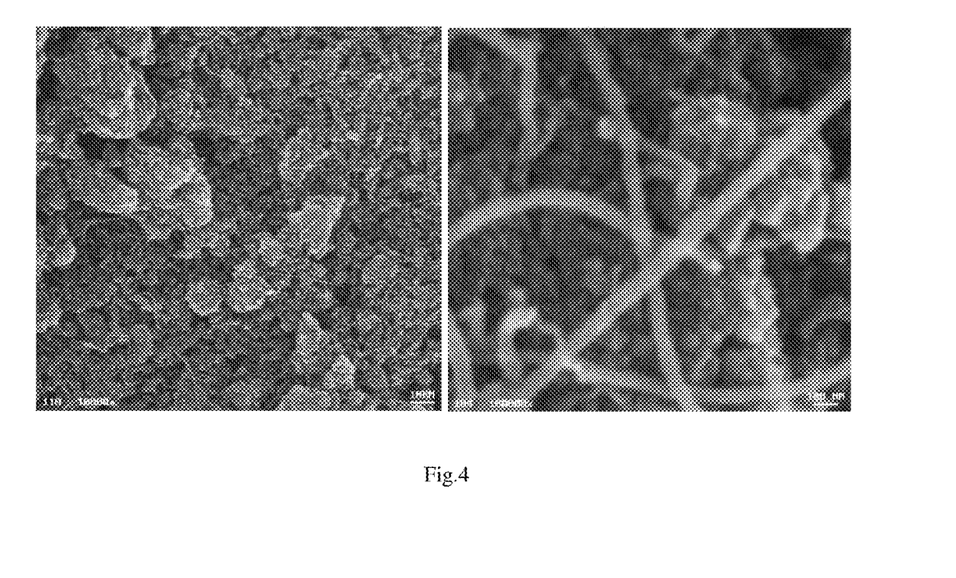
FIG. 4 is a view of an electrode made of a composite nano-structured carbon material consisting of activate FAS carbon and carbon nano-tubes.

FIG. 3 illustrates the principle of making a roll 50 by coiling a band around a central electrode 13. Lengths of electrode sheets 10 and 20 are placed on the substrate with a shift of one-half of the electrode width, their electrochemically active layers facing each other, so as to produce an alternating pair of opposite-polarity electrodes 1 and 2. The resultant roll 50 is placed in a peripheral electrode 14 provided with covers 60 at the end faces thereof. Covers 60 of electrical insulation material are normally inserted after electrode roll 50 has been impregnated with electrolyte. Electrode sheets 10 and 20 spaced by a porous separator 30 as described above are placed on electrical insulation film 40 and are subjected to heat treatment under pressure (lamination). The resultant band is coiled into roll 50 comprising one layer of electrical insulation film 40 and lengths of electrodes sheets 10 and 20 placed thereon in opposite directions and shifted relative to each other to half the width of electrodes 1 and 2 and having porous separator 30 placed between them.

To obtain an electrode roll, contact electrodes 12 of the electrode sheet extend beyond the endmost electrodes placed at the opposite ends of the resultant band. One contact electrode 12 is connected to central electrode 13 by coiling it around central electrode 13 of the band. The other contact electrode forms the outer surface of the roll and connects the outer surface of electrode roll 50 to a peripheral electrode 14. This design provides reliable electrical contact with peripheral electrode 14 and helps seal off the interior of the multi-element capacitor. The outlying electrodes of the electrode sheet are brought into contact with contact electrodes 12 made of a conductive carbon material, for example, graphite foil.

Central electrode 13 and peripheral electrode 14 are made of metal tubing of, for example, aluminum and its alloys, and covers 60 of electrical insulation material, for example, plastics, are inserted from both end faces of the electrode roll between the central and peripheral electrodes. Typically, covers 60 of electrical insulation material are inserted after electrode roll 50 has been impregnated with electrolyte. The contact between cover 60 and end face edges of coiled electrode roll 50 are sealed, for example, with a compound based on epoxy resin.

Figure 2:
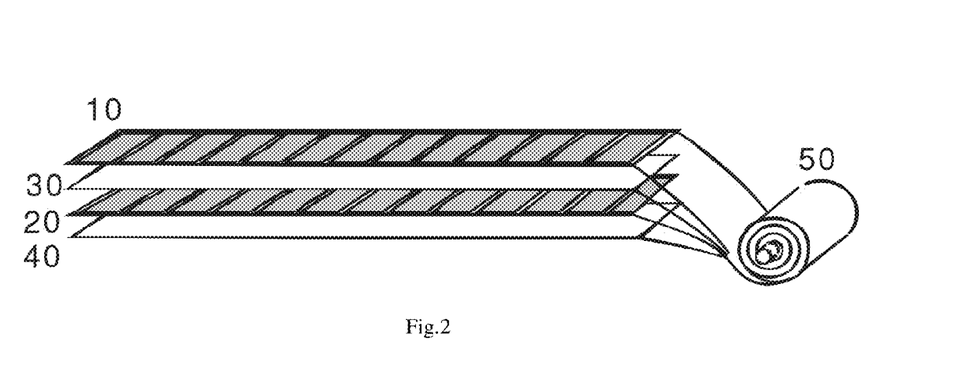
FIG. 2 is a diagrammatic view of the structure of a multi-element electrochemical capacitor, showing diagrammatically the stacking of electrical insulation film and electrode sheets, with a porous separator placed between them.

Electrodes 1 and 2 are obtained by chemical and/or electrochemical deposition of a dispersion of the aforesaid electrode mixture prepared in an organic electrolyte (ionic fluid) on the polymer frame of the electrode sheet at a weight ratio of the electrode material to electrolyte between 1:1 and 1:2 by ultrasonic dispersion, with or without solvents added, followed by vacuum treatment of the dispersion prepared as above.

The electrochemically active surface material of the positively charged working part of the electrodes is obtained by adding, in a chemical and/or electrochemical process, nano-sized particles of metals, such as, for example, manganese, silver, nickel, and lead, or metal compounds, for example, manganese oxide and nickel hydroxide, and redox polymers, to the composite electrode mixture comprising, for example, carbon nano-tubes of a few layers and activated carbon black.

The electrochemically active surface material of the negatively charged working part of the electrodes is obtained by adding, in a chemical and/or electrochemical process, nano-sized particles of metals, for example, zinc or iron, and metal compounds, for example, zinc hydroxide, iron hydroxide, and lead dioxide, or redox polymers, to the composite electrode mixture comprising, for example, carbon nano-tubes of a few layers and activated carbon black.

The aforesaid chemical and/or electrochemical treatment of an electrochemically active material in the specific embodiments of the claimed electrochemical capacitor may be carried out in aqueous solutions of sulfuric or phosphoric acid at a concentration of 1 to 30 mass %, in aqueous and nonaqueous solutions of potassium, sodium or ammonium salts of organic and inorganic acids, for example, sulfates, chlorides, fluorides, phosphates, diphosphates, acetates, tartrates, and formates of alkaline metals, or ammonium, or complex compounds, and also in aqueous or water-organic solutions of alkalis at concentrations of 1 to 70 mass %.

Addition of metals, their compounds, or redox polymers modifying the structure and composition of the surface layer of the positively charged and negatively charged working parts of the electrodes may improve the performance characteristics of the electrodes and the capacitor as a whole, such as energy output growth as a result of reversible redox reactions, higher operating voltage, and improved mechanical properties of the coating. The content of metals, their compounds, or redox polymers is not, however, to go over a certain limit that, if exceeded, causes the strength of the electrochemically active layer to decline. This limit is ascertained experimentally in each specific case.

Organic electrolyte is added by applying an aerosol dispersion of organic electrolyte, with or without solvent, to the electrode sheet prior to coiling, or by impregnating the composite electrode material and porous separator 30 during the coiling process, or by preimpregnating the composite electrode material in supercritical $CO_2$ conditions, or by placing the multi-element capacitor coiled into roll 50 in an electrolyte bath, or by impregnating the composite electrode material and porous separator 30 of the multi-element capacitor coiled into roll 50 in supercritical $CO_2$ conditions.

The electrolyte used for impregnating electrode roll 50 is an organic electrolyte that is an organic salt solution based on, for example, ammonium tetra-alkyl or dialkyl-imidazole tetrafluoroborate, in an organic solvent, for example, acetonitrile, or a mixed electrolyte comprising a solution of an inorganic salt, for example, zinc chloride, in an organic solvent, for example, acetonitrile, or an inorganic electrolyte, for example, aqueous solutions of potassium alkali. Electrode roll 50 is impregnated with electrolyte in a vacuum chamber, for example, under residual pressure of 10 Pa.

The electrochemical capacitor may comprise one electrode sheet or several parallel electrode sheets 10 and 20. One electrode sheet or several parallel electrode sheets 10 and 20 impregnated with electrolyte may be placed in a parallelepiped-shaped casing.

An electrochemical capacitor assembled as described above in ready for immediate use. To improve the energy characteristics of the electrochemical capacitor, it is operated at elevated temperatures within the range of 30 to 65° C., preferably at 60° C. The electrochemical capacitor is charged with relatively high currents in the galvanostatic mode. Individual electrochemical capacitors are connected into a battery in a parallel-series circuit that achieves optimal energy and power output of the electric charge accumulated by the capacitor.

Furthermore, in contrast to the immediate prior art, the electrochemical capacitor improves specific characteristics (specific energy output, energy density, current density, specific power, specific charge, and voltage) in comparison with conventional electrochemical capacitors having carbon electrodes and using a twin-layer charge accumulation mechanism, or chemical current sources using reversible redox chemical reactions, at approximately equal material costs. This helps achieve the claimed objective of developing an electrochemical capacitor having practicable specific characteristics that make it a suitable technical and economic choice for use.

The feasibility of the claimed multi-element electrochemical capacitor is illustrated by the following examples:

EXAMPLE 1

Figure 5:
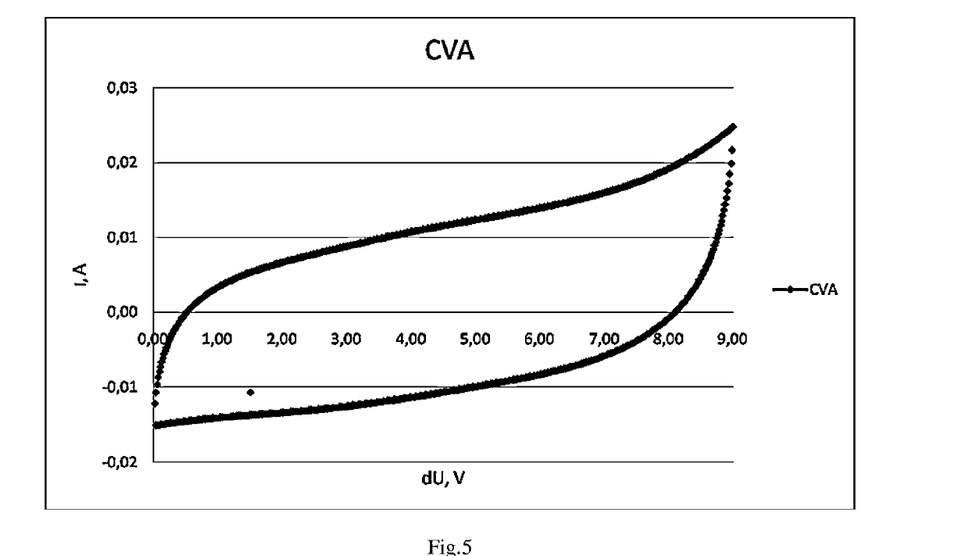
FIG. 5 illustrates an example of a cyclic volt-amperogram of a three-element capacitor manufactured by the claimed method and comprising two electrode sheets, each of them having two electrodes of a composite carbon material attached thereto and spaced by a porous separator made of PVDF track membranes impregnated with ionic fluid of 1-butyl-3-methyl-imidazole tetrafluoroborate.
Figure 6:
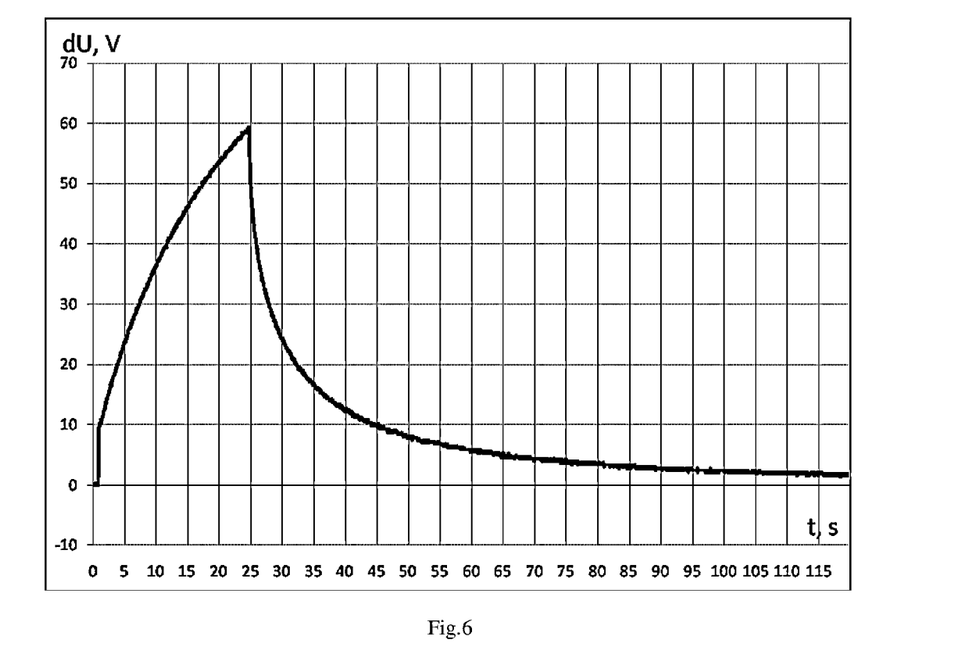
FIG. 6 illustrates an exemplary charge-discharge cycle of a 60-element capacitor having 1 M of KOH electrolyte (charge current 0.4 A)
Figure 7:
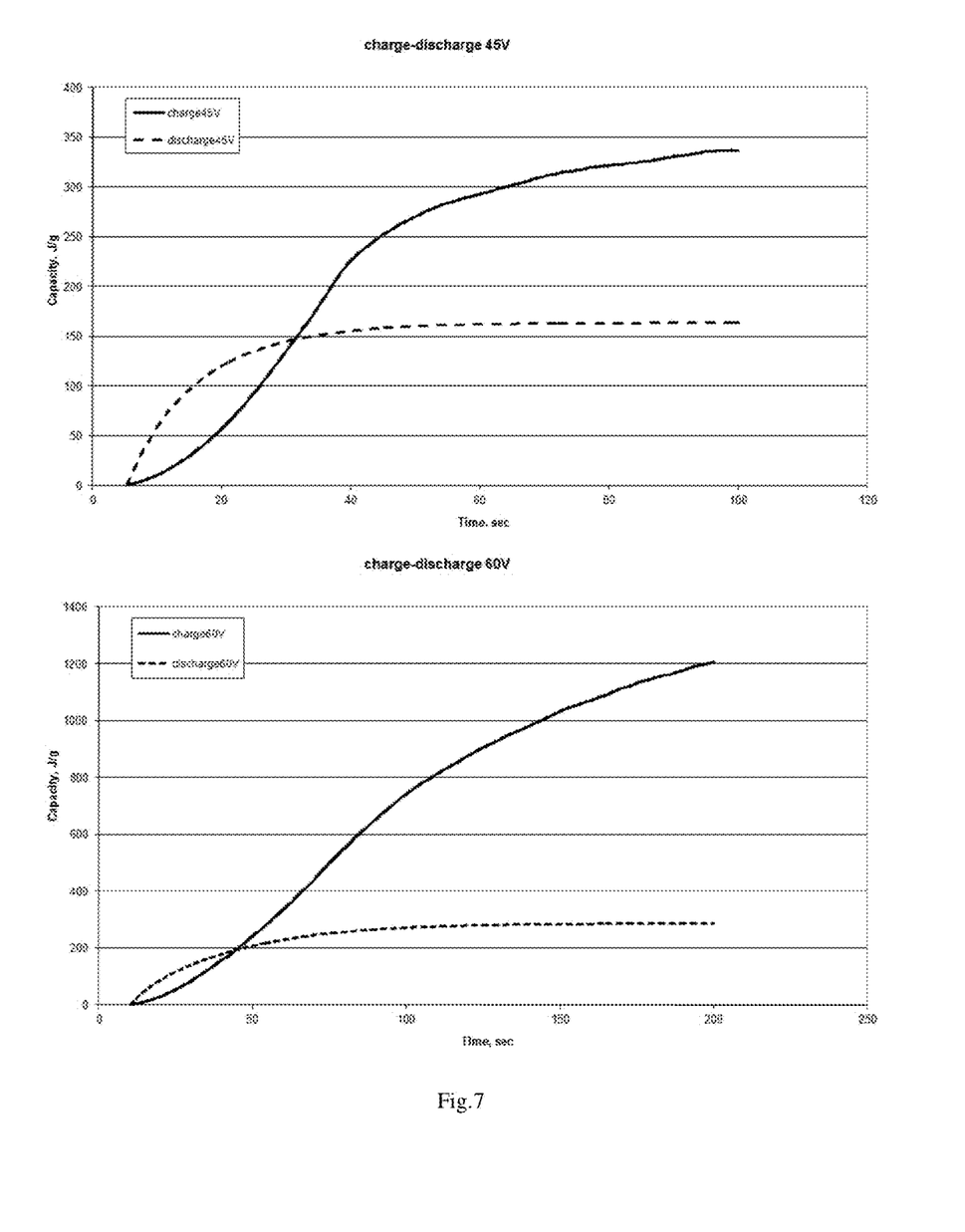
FIG. 7 illustrates an example of calculation of charge-discharge energy of a 15-element capacitor having EMIM BF4 electrolyte.

Assembly of a three-element capacitor. Electrodes measuring 80×45 mm$^2$ were made of a mixture of activated FAS and UNT carbon by benzene pyrolysis on a catalyst containing ferrocene, with ASCG silica gel added thereto, at a ratio of 1:1:1, of a total weight of 0.140 g. Following ball mill grinding for 20 minutes and preliminary treatment of the carbon material solution in ethanol for 10 minutes by a 10 W ultrasonic source, they were applied to GF-D graphite foil by aerosol dispersion. The adjacent electrodes were spaced 5 mm apart. The electrodes were spaced by a separator consisting of four layers of track membrane having a pore ratio of 11.7% and a thickness of 23 μm. The electrodes and membrane were impregnated with EMIM BF4 (Merck) ionic fluid. FIG. 5 shows a cyclic volt-amperogram at a charge-discharge rate of 50 mV/sec. The specific parameters calculated on the basis of CVA data were as follows: charge voltage dU=9 V, C=0.4 F; $E_{charge}$=47.7 W·hr/kg, and $E_{discharge}$=32.2 W·hr/kg of the weight of the active electrode material, and efficiency=67.6%.

EXAMPLE 2

Assembly of a 60-element capacitor. Electrodes measuring 200×85 mm$^2$ were made of activated carbon (coco base) and UNT obtained by toluene pyrolysis on a catalyst containing ferrocene and carbon black added thereto at a ratio of 2:2:1. Following ball mill grinding for 20 minutes and preliminary treatment of the carbon material solution in ethanol for 10 minutes by a 10 W ultrasonic source, they were applied to GF-D graphite foil by aerosol dispersion in a layer 140 μm thick. The electrode material weighed 46.8 g. The adjacent electrodes were spaced 5 mm apart. The electrode were spaced apart by a porous separator consisting of four layers of track membrane having a pore ratio of 11.7% and thickness of 23 μm. The electrodes and membrane were impregnated with electrolyte, 1M of KOH solution. When the specific parameters were calculated on the basis of data of the voltage and current versus time dependence, the energy stored was 2.7 W·hr/kg of active electrode mass.

EXAMPLE 3

Assembly of a one-element capacitor. Electrodes measuring 40×40 mm$^2$ were made of a mixture of activated PFT and UNT carbon obtained by methane pyrolysis on a catalyst containing cobalt and molybdenum at a ratio of 1:1, with Pb deposited on the anode and PbO$_2$ on the cathode. Following preliminary treatment of the carbon material solution in ethanol for 10 minutes by a 10 W ultrasonic source, they were applied to GF-D graphite foil by aerosol dispersion in a layer 80 μm thick. The electrode material weighed 115 mg. The electrodes were spaced apart by a porous separator consisting of one layer of track membrane having a pore ratio of 11.7% and thickness of 23 μm. The electrodes and membrane were impregnated with electrolyte, a 4.7 M aqueous solution of sulfuric acid. When charged with 2 V voltage, the capacitor stored energy of 27.7 W·hr/kg of active electrode mass.

EXAMPLE 4

Assembly of a 15-element capacitor. Electrodes measuring 40×85 mm$^2$ were made of activated PFT-O and UNT carbon black obtained by methane pyrolysis on a catalyst containing cobalt and molybdenum at a ratio of 5:1, to which 20% of GSM-2 graphite was added. Following ball mill grinding for 20 minutes and preliminary treatment of the carbon material solution in ethanol for 10 minutes by a 10 W ultrasonic source, they were applied to a nonwoven polypropylene sheet by aerosol dispersion in a layer 90 μm thick. The electrode material weighed 1.1 g and was placed on lengths of GF-D graphite foil. The distance between the adjacent electrodes was 5 mm. The electrodes were spaced apart by a porous separator consisting of two layers of track membrane having a pore ratio of 11.7% and thickness of 23 μm. The electrodes and membrane were impregnated with electrolyte, EMIM BF4 (Merck) ionic fluid. When the specific parameters were calculated on the basis of the data for voltage and current versus time dependence, the discharge energy accumulated was 41 W·hr/kg of active electrode mass for the electrode charge voltage of 45 V and 107 W·hr/kg of active electrode mass for the electrode charge voltage of 60 V. The specific power on discharge was 13.5 kW/kg of active electrode mass for the electrode charge voltage of 45 V, and 14.3 kW/kg of active electrode mass for the electrode charge voltage of 65 V.

What is claimed is:

1. A multi-element electrochemical capacitor, comprising:
   at least one layer of electrical insulation film and alternating opposite-polarity electrode sheets placed thereon in succession and spaced apart by a porous ion-permeable separator;
   wherein the electrode sheets and porous ion-permeable separator are coiled into a roll;
   wherein each of the electrode sheets comprises:
   a substrate of nonwoven polymer material having a high pore ratio;
   wherein the substrate is made of an electron-impermeable and ion-impermeable material that is chemically and electrochemically inactive in an electrolyte;
   at least one electrode attached to one side or both sides thereof, or embedded within the substrate;
   an electrochemically active layer formed on the substrate;

wherein the electrochemically active layer contains nano-sized particles of metals or their compounds, or redox polymers;

wherein the electrodes of the opposite-polarity electrode sheets are made of a composition of nano-structured carbon materials of different types;

wherein a first type of the nano-structured carbon materials has a largest possible specific surface area and a relatively low conductance;

wherein a second type of the nano-structured materials has a relatively large specific surface area and a relatively high conductance; and contact electrodes adapted to be connected to central and peripheral electrodes.

2. The capacitor as claimed in claim 1, wherein carbon nano-tubes of a few layers serve as the first type of the nano-structured carbon materials, and wherein any one of activated carbon, activated carbon black, metal-impregnated carbon, and nano-porous material based on carbides of metals including any one of Ti, B, and Si serves as the second type of the nano-structured carbon materials.

3. The capacitor as claimed in claim 1, wherein the material of a positive electrode of the electrode sheet contains nano-sized particles of metals including any one of manganese, mercury, silver, and nickel, metal compounds including any one of manganese dioxide, manganese hydroxide, mercury oxide, silver oxide, lead oxide, lead sulfate, nickel hydroxide, and lithium-cobalt oxide, and wherein the material of a negative electrode contains nano-sized particles of metals including any one of zinc, lead, cadmium, iron, and lithium, and metal compounds including any one of zinc hydroxide, zinc chloride, lead sulfate, cadmium hydroxide, and iron hydroxide.

4. The capacitor as claimed in claim 1, wherein the electrode sheet in contact with the electrical insulation film is placed with the electrochemically active layer facing up from the electrical insulation film, and the next electrode sheet is shifted to half the width of the electrochemically active layer, the electrochemically active layers of the electrode sheets facing each other and being interspaced by the porous ion-permeable separator.

5. The capacitor as claimed in claim 1, wherein the electrodes of the electrode sheet are attached to the substrate in succession.

6. The capacitor as claimed in claim 1, wherein an outer surface of the roll is connected to the peripheral electrode by a contact electrode, the roll being placed in the peripheral electrode made of metal tubing, the end faces of the peripheral electrode being provided with covers.

7. A method for manufacturing a multi-element electrochemical capacitor, comprising the steps of:

preparing electrode mixtures containing nano-structured carbon materials of different types, wherein a first type of the nano-structured carbon materials has a largest possible specific surface area and a relatively low conductance, wherein a second type of nano-structured carbon materials has a relatively large specific surface area and a relatively high conductance;

manufacturing opposite-polarity electrode sheets by applying the electrode mixtures to one side or both sides of, or embedding them within, a substrate made of a nonwoven polymer material having a high pore ratio;

wherein the substrate is made of an electron-impermeable and ion-impermeable material that is chemically and electrochemically inactive in an electrolyte;

producing on the substrate an electrochemically active layer containing nano-sized particles of metals or their compounds, or redox polymers;

placing successively, on at least one layer of an electrical insulation film, the opposite-polarity electrode sheets spaced apart by a porous ion-permeable separator;

coiling the layers into a roll around a central electrode;

connecting an outer surface of the roll to a peripheral electrode; and impregnating the roll with the electrolyte.

8. The method as claimed in claim 7, wherein the outer surface of the roll is connected to the peripheral electrode by a contact electrode that forms the outer surface of the roll inserted into the peripheral electrode, the end faces of the peripheral electrode being closed with covers made of electrical insulation material after the roll has been impregnated with the electrolyte.

9. The method as claimed in claim 8, wherein the central and peripheral electrodes are made of tubing of aluminum and alloys thereof and the covers are made of plastics.

10. The method as claimed in claim 7, wherein carbon nano-tubes of a few layers are used as the first type of the nano-structured carbon materials, and wherein any one of activated carbon, activated carbon black, metal-impregnated carbon, and nano-porous carbon material based on carbides of metals including any one of Ti, B, and Si is used as the second type of the nano-structured carbon materials.

11. The method as claimed in claim 10, wherein the carbon nano-tubes are produced by pyrolysis of a mixture of a gaseous hydrocarbon and hydrogen, wherein the carbon nano-tubes measure 5 to 50 nm, have a specific surface area of 500 to 1,000 $m^2/g$, and a specific conductance of 10 to 100 Sm/cm.

12. The method as claimed in claim 11, wherein pyrolysis of the mixture of the gaseous hydrocarbon and hydrogen is carried out at a temperature maintained within the range of 650 to 900° C. and a pressure within the range of 0.1 to 1.0 MPa, wherein compounds based on any one of cobalt and molybdenum are used as a catalyst, and any one of natural gas, propane, butane, and ethylene is used as the gaseous hydrocarbon.

13. The method as claimed in claim 10, wherein the carbon nano-tubes are produced by pyrolysis of a mixture of an aromatic hydrocarbon and alcohol.

14. The method as claimed in claim 13, wherein pyrolysis of the mixture of the aromatic hydrocarbon and alcohol is carried out at a temperature maintained within the range of 650 to 900° C. and a pressure within the range of 0.1 to 1.0 MPa, wherein compounds based on any one of iron, nickel and magnesium oxide are used as a catalyst, wherein any one of benzene and toluene is used as the aromatic hydrocarbon, and wherein ethanol is used as the alcohol.

15. The method as claimed in claim 14, wherein the carbon nano-tubes are subjected to further treatment by any one of oxidizing agents, ultrasound, and water in supercritical conditions.

16. The method as claimed in claim 10, further comprising the step of using activated carbons produced by wet formation of a synthetic monomer followed by carbonization and high-temperature vapor-gas activation at a temperature in the range of 600 to 1,000° C.

17. The method as claimed in claim 10, further comprising the step of using nano-porous carbon materials obtained from any one of boron, titanium, and silicon carbides that are subjected to further high-temperature thermochemical treatment with chlorine at a temperature in the range of 600 to 1,200° C.

18. The method as claimed in claim 10, wherein the electrode mixtures are prepared by mixing the carbon nano-tubes and activated carbon at a ratio of 1:3 to 3:1 in ball mills producing grains measuring about 10 to 100 nm that are sifted on screens with a typical mesh size of 100 nm and treated with ultrasound to give maximum uniformity to the electrode mixtures.

19. The method as claimed in claim 7, wherein a positive electrode of the electrode sheet is manufactured from nano-sized particles of metals including manganese, mercury, silver, and nickel, and metal compounds including manganese dioxide, manganese hydroxide, mercury oxide, silver oxide, lead oxide, lead sulfate, nickel hydroxide, and lithium-cobalt oxide, and a negative electrode is manufactured from nano-sized particles of metals including any one of zinc, lead, cadmium, iron, and lithium, and metal compounds including any one of zinc hydroxide, zinc chloride, lead sulfate, cadmium hydroxide, and iron hydroxide.

20. The method as claimed in claim 7, wherein the electrode sheets are manufactured by applying a suspension of the electrode mixtures dispersed by ultrasound in an organic solvent to the substrate.

21. The method as claimed in claim 20, wherein any one of isopropanol and ethanol is used as the organic solvent.

22. The method as claimed in claim 7, wherein the electrode mixtures are applied in powder form to the substrate under the effect of electrostatic forces.

23. The method as claimed in claim 7, wherein at least one of the electrode sheets is placed, after the electrode mixtures have been applied thereto, on a contact electrode including graphite foil and heated to a temperature between 120 and 150° C. and pressed at a pressure of 0.5 to 1.0 MPa.

24. The method as claimed in claim 7, wherein the porous ion-permeable separator is made up of one to four layers, wherein at least one of the layers is a track membrane manufactured from polymer film 3 to 5 µm thick, has a pore ratio of 20 to 40%, and a pore size of 0.05 to 0.1 µm, or a sheet of nonwoven polymer material including polypropylene that is 10 µm thick at a density of 15 to 40 mg/cm$^2$, or an ion-permeable polymer membrane manufactured from polybenzimidazole that is 10 to 15 µm thick and impregnated with the electrolyte and containing 3 to 10 mass parts of the electrolyte.

25. The method as claimed in claim 7, wherein the electrolyte used for impregnating the roll is an organic electrolyte comprising an organic salt solution containing cations based on any one of ammonium and imidazole, and anions including any one of tetrafluoroborate, hexafluorophosphate and triflatimide, bistriflatimide, tris(pentafluoroethyl)trifluorophosphate in acetonitrile, propylene carbonate, formamide, and an inorganic electrolyte including an aqueous solution of a potassium alkali.

26. The method as claimed in claim 7, wherein the roll is impregnated in the electrolyte in a vacuum chamber under a residual pressure of 10 Pa.

27. The method as claimed in claim 7, wherein several parallel electrode sheets are coiled into the roll and placed in a casing in the form of a parallelepiped or cylinder.

* * * * *